United States Patent [19]

Cardinal, Jr.

[11] 4,050,972
[45] Sept. 27, 1977

[54] LAYING DOWN OF LARGE SHEETS OF FILM

[76] Inventor: Daniel E. Cardinal, Jr., 1352 Estate Lane, Lake Forest, Ill. 60045

[21] Appl. No.: 772,305

[22] Filed: Feb. 25, 1977

[51] Int. Cl.$^2$ .................................. B32B 31/08
[52] U.S. Cl. ............................ 156/71; 47/28 R; 47/DIG. 11; 156/306; 156/544; 156/583; 242/55; 242/86.52; 273/27
[58] Field of Search ................ 242/55, 86.52; 156/71, 156/544, 559, 583, 306; 47/28 R, DIG. 11; 273/27

[56] References Cited

U.S. PATENT DOCUMENTS

| | | | |
|---|---|---|---|
| 3,473,755 | 10/1969 | Brown | 242/86.52 |
| 3,559,914 | 2/1971 | Alderman | 242/86.52 |

Primary Examiner—Edward G. Whitby
Attorney, Agent, or Firm—Andrus, Sceales, Starke & Sawall

[57] ABSTRACT

A long plastic film roll is manufactured in situ for covering an agricultural, athletic or other field. A plurality of short plastic film rolls are supported on drivable rollers, which in turn are mounted on a plurality of spaced trucks extending along the width of the field. The axes of the film rolls are parallel, but alternate rolls are staggered with every other roll being disposed either forwardly or rearwardly of the adjacent rolls. The roll ends overlap and, as the trucks move longitudinally down the field to lay down the film, the overlapping edges of the film are sealingly joined together as they leave their respective rolls and just before being laid down.

8 Claims, 4 Drawing Figures

LAYING DOWN OF LARGE SHEETS OF FILM

BACKGROUND AND SUMMARY OF THE INVENTION

This invention relates to laying down of large sheets of film, especially for temporary protective purposes.

It is known that it is sometimes desirable to provide a protective cover over plants to prevent damage from frost and the like. This is relatively easy to do with small gardens, but is quite difficult with large fields of crops.

Furthermore, it is also known to be desirable to provide a protective cover for athletic playing fields such as football fields and baseball diamonds, to protect the grass cover from heavy rain and the like.

It is desirable that a field cover be as light in weight as possible in view of its large size. Polyethylene and similar plastic films arequite adequate for the job, but are subject to the disadvantage of being available in rolls of limited length, such as about 10 feet. To manufacture a one piece longer roll for a field of 100–500 ft. width, and then to transport the roll to the field, is an almost impossible task because the roll is so unwieldy.

The present invention is directed to a solution of the aforementioned problem and involves the concept of "manufacturing" a long roll of plastic film from short rolls in situ, while simultaneously laying the film onto the field.

In accordance with the invention, a plurality of short plastic film rolls are supported on drivable rollers, which in turn are mounted on a plurality of spaced trucks extending along the width of the field. The axes of the film rolls are parallel, but alternate rolls are staggered with every other roll being disposed either forwardly or rearwardly of the adjacent rolls. The roll ends overlap and, as the trucks move longitudinally down the field to lay down the film, the overlapping edges of the film are sealingly joined together as they leave their respective rolls and just before being laid down.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
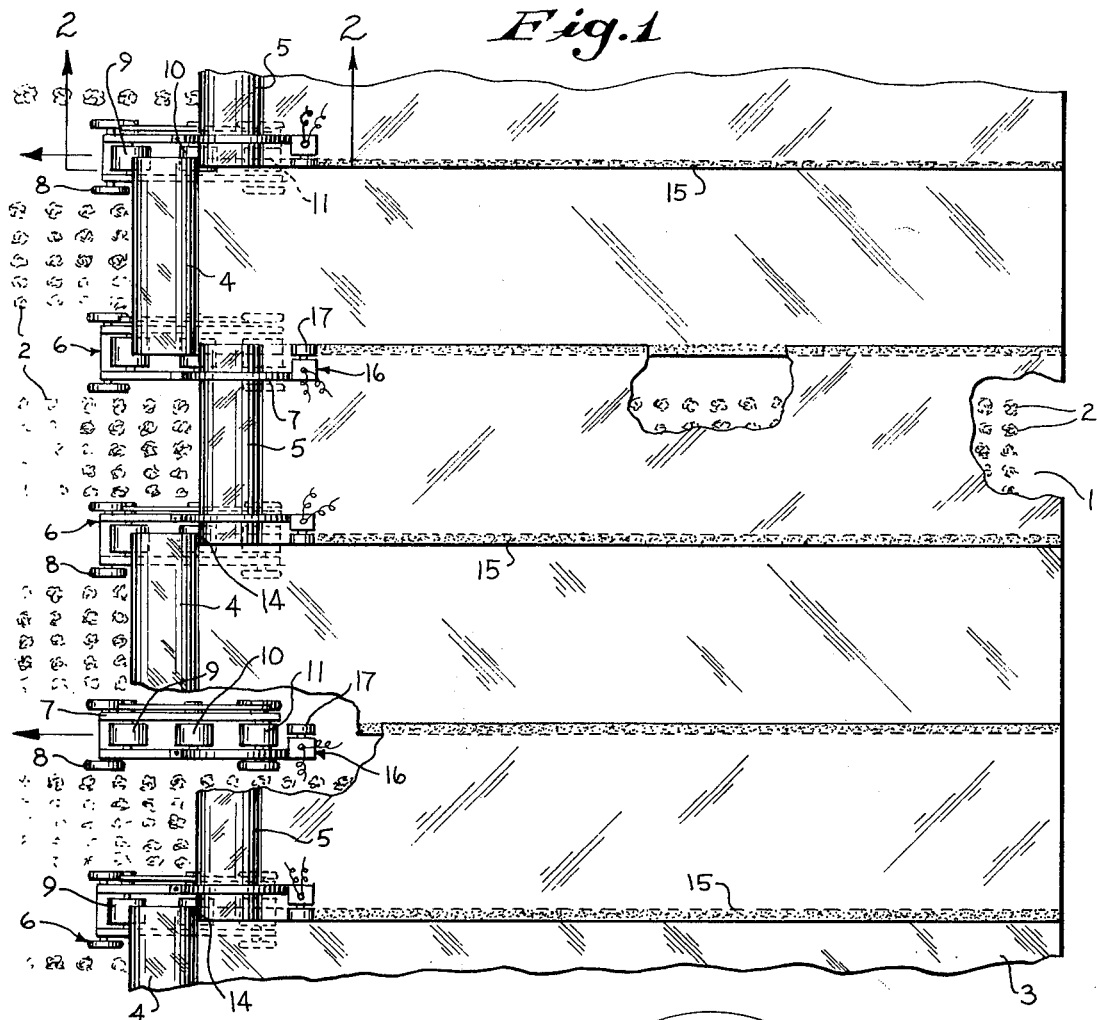
FIG. 1 is a schematic top plan view of a portion of a field having a large sheet of plastic film being manufactured in situ and laid thereon, with parts broken away.

Although the concept of the invention may be used in covering many types of fields, the embodiment shown in the drawings is for agricultural purposes wherein a field 1 has a number of growing plants 2 which are to be protected from frost or the like, by a large unitary sheet 3 of plastic film.

The film is initially supplied in rolls 4, 5 of relatively short length, such as about 10 ft. Assuming that the field is substantially wider than the axial length of one roll, it is necessary to provide a plurality of rolls 4, 5 disposed in generally end-to-end relationship in order to cover the entire field.

In accordance with one aspect of the invention, rolls 4, 5 are mounted laterally on spaced transport assemblies comprising a plurality of substantially identical trucks 6. Each truck has a frame 7, wheels 8 supporting the frame, and three parallel longitudinally spaced rollers 9, 10, 11 for externally supporting and cradling the end portions of film rolls 4, 5. Rollers 9, 10 and 11 are rotatably driven by a belt 12 which is connected to a reversible drive motor 13, with the latter also connected to drive wheels 8 in any suitable well-known manner to move the respective truck 6 along the field.

In accordance with another aspect of the invention, the film from rolls 4, 5 is unwound therefrom, the adjacent film edges joined to form a large sheet, and the sheet laid onto field 1, all while trucks 6 are traversing the field. For this purpose, and referring to FIGS. 1 and 2, alternate rolls 4 and 5 are staggered. Thus, rolls 4 are disposed forwardly of rolls 5 and are supported or cradled between pairs of front rollers 9 and middle rollers 10. Rolls 5 are supported or cradled between pairs of middle rollers 10 and rear rollers 11. Middle drive rollers 10 are therefore common supports for both film rolls 4 and 5. In addition, the ends of adjacent film rolls are positioned to overlap, as at 14.

To provide a unitary sheet 3 for covering field 1, means are provided to join the overlapped portions of the film along a seam 15. For this purpose, a sealing means 16 is disposed rearwardly of roller 11 on each truck and in line with overlap 14. In the present embodiment, the sealing means comprises a pair of heated rollers 17 which form a nip 18 through which the overlapped film edges pass.

Figure 2:
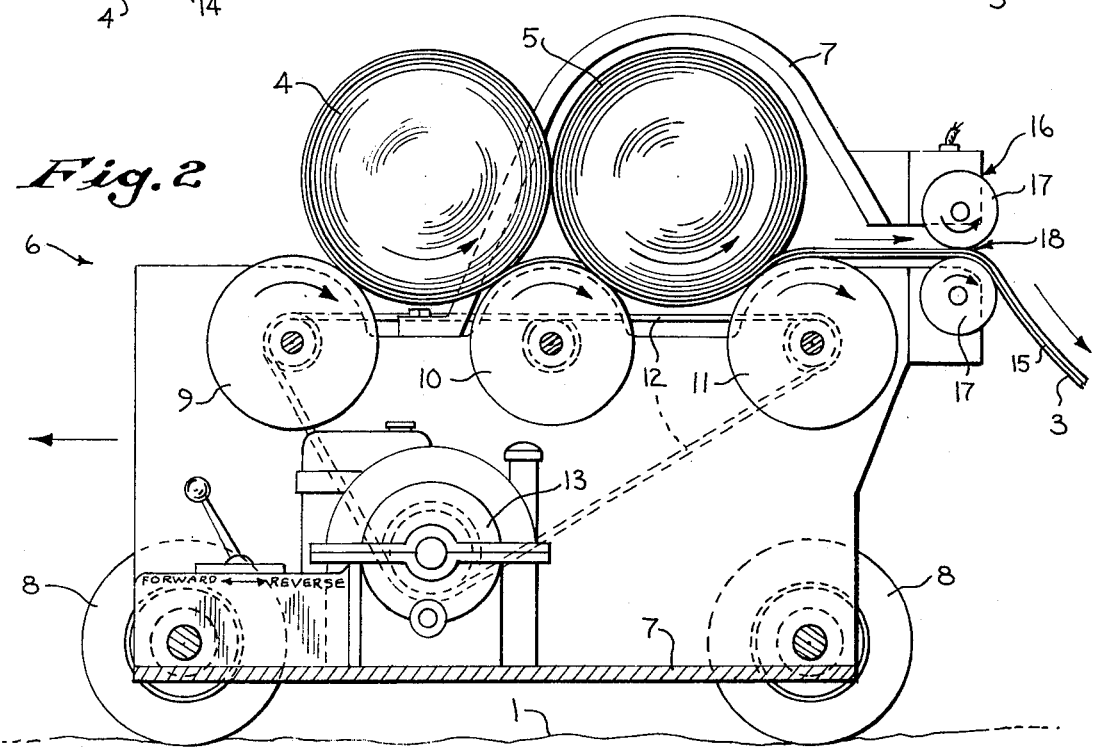
FIG. 2 is a longitudinal section of one of the roll-carrying trucks, taken on line 2—2 of FIG. 1, and showing the movement during film laying.

As shown in FIGS. 1 and 2, trucks 6 are driven forwardly down the length of the field, with rollers 9, 10 and 11 rotating film rolls 4 and 5 so that edge-to-edge overlapped film passes rearwardly through the sealing nips 18 and is then laid down onto the field in the form of a unitary sheet. Assuming that the length of each film segment playing out from rolls 4 and 5 is equal to the length of field 1, the rolls will run out just as the far end of the field is reached.

Sheet 3 may be left on the field for as long as desired. It may be provided with perforations, not shown, to permit plants 2 to breath. Alternately, air or heat may be supplied beneath sheet 3 by any suitable equipment.

Figure 3:
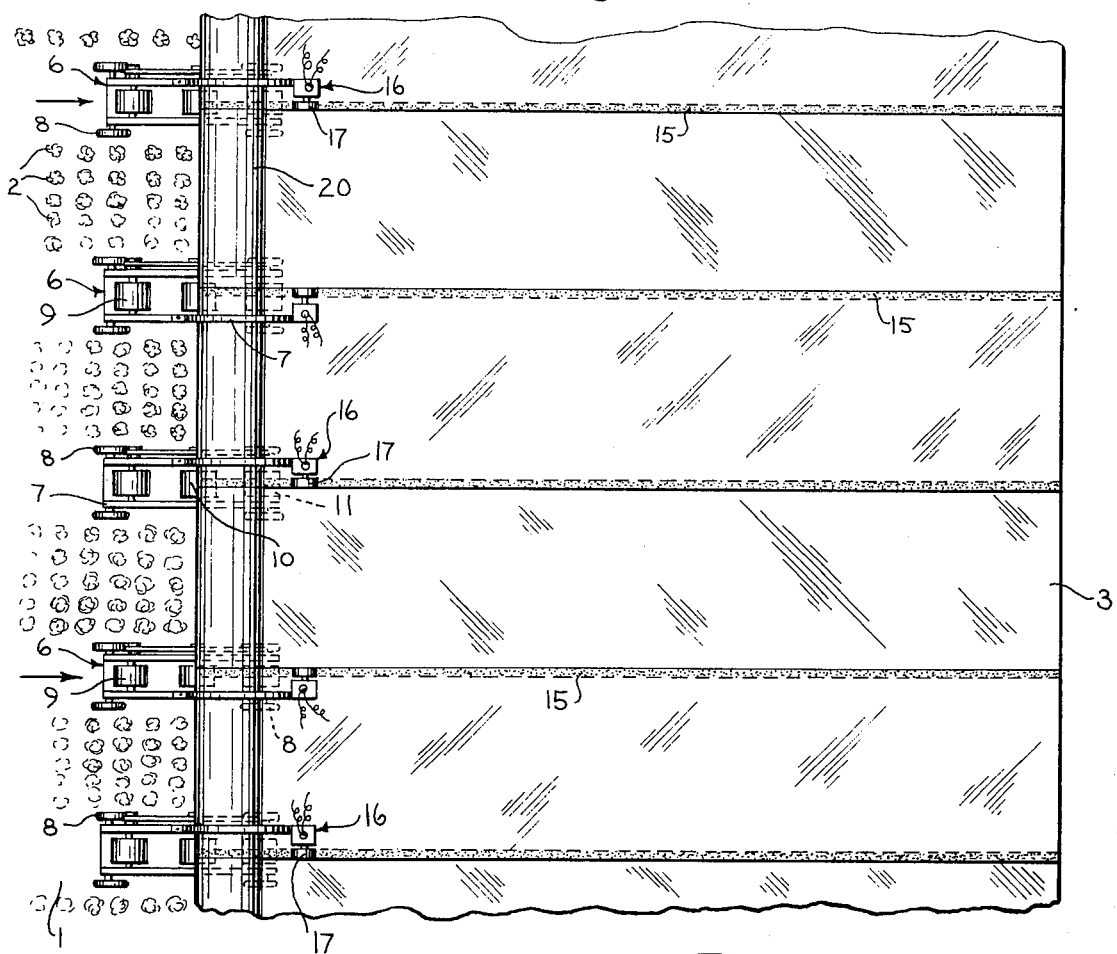
FIG. 3 is a view similar to FIG. 1 during film wind-up.
Figure 4:
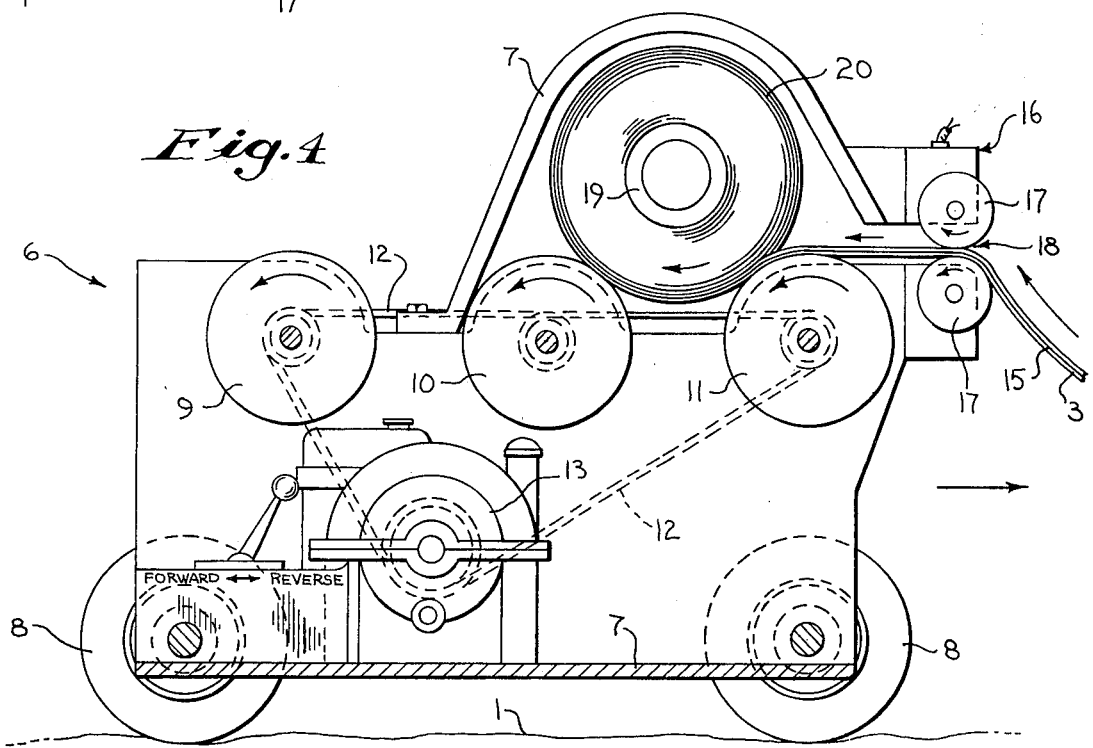
FIG. 4 is a view similar to FIG. 2 during the wind-up procedure.

After the protective cover or blanket has served its purpose, it is desirable to remove it from the field. As shown in FIGS. 3 and 4, the end edge of sheet 3 is wound onto a core 19 and is disposed for support between rollers 10 and 11. Then, as the direction of rotation of these rollers is reversed and trucks 6 are driven back down field 1, sheet 3 will wind up to form a single long roll 20 supported intermediate its ends solely by a plurality of rollers 10 and 11. Rollers 9 are not used for the wind-up process. They nevertheless are shown as being driven in reverse along with rollers 10 and 11, although they could be clutched out of the system.

When trucks 6 reach their beginning positions, at the right in FIG. 3, all the film will be wound up onto roll 20 and the trucks and roll may remain along the end of the field until the protective covering is again needed.

The concept of the invention provides a unique system for quickly and efficiently laying down and also removing a large sheet of film from a field, wherein the sheet initially comprises a plurality of separate pieces wound up onto short rolls. With the multiple roller support and drive system, film rolls 4 and 5 of differing diameters may be easily accommodated.

Various modes of carrying out the invention are contemplated as being within the scope of the following claims particularly pointing out and distinctly claiming the subject matter which is regarded as the invention.

I claim:

1. In an apparatus for protectively covering a large field with a removable unitary film sheet:
    a. means for externally supporting a plurality of axially short film rolls in generally end-to-end staggered overlapping relationship,
    b. means for moving said supported rolls down the field,
    c. means for unwinding said overlapping rolls as they are moved down the field,
    d. and means for joining the overlapped edges of said film as it unwinds from said rolls.

2. An apparatus for protectively covering a large field with a removeable film sheet, said apparatus comprising:
    a. a plurality of spaced transport assemblies adapted to traverse the field longitudinally in forward and rearward directions,
    b. roller means on said transport assemblies for externally supporting a plurality of short rolls of film in generally end-to-end but staggered relationship, with said rolls extending between said transport assemblies and with the ends of adjacent rolls overlapping,
    c. means for driving said transport assemblies forwardly down the field,
    d. means for rotating said roller means as said transport assemblies are driven to thereby unwind said film rolls so that the film is laid onto the field,
    e. and joining means on said transport assemblies and disposed rearwardly of said roller means for sealingly joining the overlapping edge portions of said film into a unitary sheet prior to laying of the film onto the field.

3. The apparatus of claim 2 wherein each said roller mean comprises three spaced parallel rollers, the front and middle roller being adapted to support an end of a first film roll extending laterally in one direction from the respective transport assembly, the rear and middle roller being adapted to support an end of a second film roll extending laterally in the opposite direction from the respective assembly.

4. The apparatus of claim 3 wherein said joining means is disposed rearwardly of said rear roller and in the path of the overlapped unwinding film.

5. The apparatus of claim 3 wherein said rear and middle rollers form means to support and wind up the said unitary sheet onto a single roll when the direction of movement of said transport assemblies and said rollers is reversed.

6. A method of protecting a large field with a removable film sheet, said method comprising:
    a. externally supporting on a transport assembly a plurality of short rolls of film in generally end-to-end but staggered relationship so that the ends of said rolls overlap,
    b. driving said assembly in one direction down the field,
    c. simultaneously rotating said rolls in one direction to thereby unwind said film in edge-to-edge overlapping relationship and lay it onto the field,
    d. and joining the overlapping edges of said film as it is unwound so that it is laid down in a unitary sheet.

7. The method of claim 6 wherein alternate rolls of film are staggered by cradling the ends of one roll between a front and middle roller and cradling the ends of an adjacent roll between a rear roller and said middle roller.

8. The method of claim 7 wherein said unitary sheet is removed from the field by:
    a. driving said assembly in the opposite direction,
    b. and simultaneously rotating said rear and middle rollers in the opposite direction to wind said unitary sheet up into a single roll supported by said last-named rollers.

* * * * *